US012779494B2

(12) United States Patent
Kerrigan et al.

(10) Patent No.: US 12,779,494 B2
(45) Date of Patent: Nov. 3, 2026

(54) LOW-K MATERIALS DERIVED BY HYDROSILYLATION AND METHODS OF USING THEM FOR DEPOSITION

(71) Applicants: L'Air Liquide, Societe Anonyme pour l'Etude et l'Exploitation des Procedes Georges Claude, Paris (FR); Air Liquide Advanced Materials, Inc., Branchburg, NJ (US)

(72) Inventors: Sean Kerrigan, Branchburg, NJ (US); Fabrizio Marchegiani, Beaverton, DE (US); Fan Qin, Newark, DE (US); Peng Zhang, Branchburg, NJ (US); Jean-Marc Girard, Paris (FR); Gennadiy Itov, Haifa (IL)

(73) Assignees: L'Air Liquide, Societe Anonyme pour l'Etude et l'Exploitation des Procedes Georges Claude, Paris (FR); Air Liquide Advanced Materials, Inc., Branchburg, NJ (US)

( * ) Notice: Subject to any disclaimer, the term of this patent is extended or adjusted under 35 U.S.C. 154(b) by 18 days.

(21) Appl. No.: 18/513,495

(22) Filed: Nov. 17, 2023

(65) Prior Publication Data

US 2025/0161976 A1 May 22, 2025

(51) Int. Cl.
*B05D 1/00* (2006.01)
*C08J 5/18* (2006.01)

(52) U.S. Cl.
CPC ................ *B05D 1/005* (2013.01); *C08J 5/18* (2013.01); *B05D 2518/12* (2013.01); *C08J 2383/16* (2013.01); *C08J 2483/16* (2013.01)

(58) Field of Classification Search
CPC ........ C08G 77/54; C08G 77/62; B05D 1/005; B05D 1/02; B05D 1/18; B05D 1/26; B05D 1/265; B05D 1/30; B05D 1/305; B05D 2401/10; B05D 2518/10; B05D 2518/12
USPC ............... 528/31, 38, 39; 556/412, 413, 424
See application file for complete search history.

(56) References Cited

U.S. PATENT DOCUMENTS 4,322,518 A * 3/1982 Blizzard ................ C08G 77/44 427/393
4,689,252 A * 8/1987 Lebrun ................. C04B 41/009 524/588
11,407,922 B2 8/2022 Khandelwal et al.
2001/0053840 A1 12/2001 Ko et al.
2003/0171477 A1 9/2003 Baba et al.
2006/0097393 A1 5/2006 Uchimaru et al.
2008/0081121 A1 4/2008 Morita et al.
2009/0311012 A1* 12/2009 Mabuchi ............ G03G 15/0818 399/286
2013/0172427 A1* 7/2013 Saxena ................... C08L 83/08 524/588
2019/0055645 A1 2/2019 Li et al.
2021/0198429 A1* 7/2021 Liu ........................ C08G 77/26

FOREIGN PATENT DOCUMENTS

JP 2004 250585 9/2004
JP 2007 084618 4/2007
JP 2007 091935 4/2007
KR 2014 9987908 7/2014
WO WO-03037963 A1 * 5/2003 ............ C08L 101/14
WO WO-2008121151 A1 * 10/2008 ........... C08G 77/448

OTHER PUBLICATIONS

Hydrosilylation. LibreTexts. Mar. 26, 2024. Retrieved from https://chem.libretexts.org/@go/page/69097 on Aug. 5, 2025. (Year: 2024).*
Azobisisobutyronitrile, Hawley's Condensed Chemical Dictionary 110 (11th ed. 1987). (Year: 1987).*
Calandra et al., "Different radical initiation techniques of hydrosilylation reactions of multiple bonds in water: ther-mal and photochemical initiation," J. Phys. Org. Chem. 2010, 23 944-949 (published online Jul. 15, 2010). (Year: 2010).*
Deriabin et al., "A metal-free radical technique for cross-linking of polymethylhydrosilane or polymethylvinylsilox-ane using AIBN," Dalton Trans. 2020, 49, 885-8858. (Year: 2020).*
2,2'-Azobisisobutyronitrile (AIBN), biolar, https://www.biolar.lv/en/produkcija/azo-iniciatori/aibn/ (last accessed Nov. 10, 2025). (Year: 2025).*
Cheng, Y.L. et al., Effect of carrier gas on the structure and electrical properties of low dielectric constant SiCOH film using trimethylsilane prepared by plasma enhanced chemical vapor deposition, Thin Solid Films 469-470 (2004) 178-183.
Hacker, N.P. et al., Properties of new low dielectric constant spin-on silicon oxide based polymers, Mat. Res. Soc. Symp. Proc. vol. 476, 1997, 25-30.

(Continued)

*Primary Examiner* — William P Fletcher, III
(74) *Attorney, Agent, or Firm* — Yan Jiang

(57) ABSTRACT

A reaction mixture for producing a film-forming polycarbosilazane polymer comprises a first compound containing at least two unsaturated groups and a second compound containing at least two —$SiH_2$— hydrosilyl functional groups, wherein the reaction mixture is capable of forming the film-forming polycarbosilazane polymer utilizing hydrosilylation of the first compound by the second compound. Also disclosed are methods of forming a silicon and carbon containing film on a substrate comprising the steps of producing a film-forming polycarbosilazane polymer by a polymerization of a reaction mixture of a first compound containing at least two unsaturated groups and a second compound containing at least two hydrosilyl functional groups, forming a solution containing the film-forming polycarbosilazane polymer, and contacting the solution with the substrate via a spin-on coating, spray coating, dip coating, or slit coating technique to form the silicon and carbon containing film on the substrate.

13 Claims, 7 Drawing Sheets

(56) References Cited

OTHER PUBLICATIONS

Hall, D.B. et al., Spin coating of thin and ultrathin polymer films, Polymer Engineering and Science, Dec. 1998, vol. 38, No. 12, 2039-2045.
Hamada, T. et al., Crack- and shrinkage-free ethylene-bridged polysilsesquioxane film prepared by a hydrosilylation reaction, ACS Omega 2021, 6, 8430-8437.
Norrman, K. et al., Studies of spin-coated polymer films, Annu. Rep. Prog. Chem., Sect. C, 2005, 101, 174-201.

* cited by examiner

LOW-K MATERIALS DERIVED BY HYDROSILYLATION AND METHODS OF USING THEM FOR DEPOSITION

TECHNICAL FIELD

The present invention relates to new low-k materials derived by hydrosilylation of an unsaturated compound by a second compound containing at least two —$SiH_2$— groups and the subsequent formulation of the resulting polymer, in particular, to new low-k materials derived by hydrosilylation of the unsaturated compound by trisilylamine and the subsequent formulation of the resulting polymer, and relates to processes of deposition of a low-k dielectric film on a substrate by wet coating, preferably spin-on deposition (SOD) using a film-forming composition comprising the resulting polymer, followed by curing and hardbaking steps.

BACKGROUND

Insulating thin films are vitally important materials in the function of microelectronic devices because these materials electrically isolate conductive components from each other in microcircuits. Low-k (low dielectric constant) films are frequently employed as insulators. Potential ways of reducing k include using materials with chemical bonds of lower polarizability than Si—O such as Si—C. Another potential method of reducing k is subtractive porosity whereby part of the material is selectively removed. This may be achieved by incorporating a thermally degradable substance called a 'porogen' which is removed by an anneal step. Incorporation of such porogens can also contribute to the deterioration of mechanical strength. Also conventional materials that are employed as dielectrics are relatively poor heat conductors and are subject to breakdown.

Two methods exist to deposit such films: chemical vapor deposition (CVD) in which precursors such as Trimethyl silane, Octamethylcyclotetrasiloxane are introduced in the gas phase and generally activated by a plasma in the presence of an oxidizer to generate a carbon-doped oxide ("SiCO:H") ("Effect of carrier gas on the structure and electrical properties of low dielectric constant SiCOH film using trimethylsilane prepared by plasma enhanced chemical vapor deposition", Thin Solid Films, 2004, 469-470:178-183). Spin coating is an alternative technique in which non-volatile silicon-containing oligomers are dissolved in a volatile solvent. This method has the advantage that the polymer can be designed and synthesized to have specific bonds or backbone structure to drive specific film properties (Polymer Engineering & Science, 1998, 38 (12), 2039-2045; Liquid Film Coating (1997), 709-734; Annual Reports on the Progress of Chemistry, Section C: Physical Chemistry, 2005, (101), 174-201), and notably the k value (dielectric constant), the mechanical hardness of the film, and the shrinkage of the film upon annealing. Among such spin on materials, some have oligomers based on siloxane (Si—O—Si) coupling of silane monomers ("Properties of New Low-k Dielectric Constant Spin-on Silicon Oxide based Polymers", MRS Online Proceedings Library, 1997, 476, 25-30), and others have silazane (Si—N—Si) based coupling (U.S. Pat. No. 11,407,922B2) and/or carbon based coupling (Si—(C)x-Si) (US20210198429A1).

JP2007091935 discloses a formulation and its synthesis based on hydrosilylation of a dendrimer/compound containing 2 SiH and a compound having a CC double or triple bond to form an oligomer that can be used in SOD formulation. Exemplary embodiments include preferably a cage silsesquioxane structure, for example $T^3_8$ containing at least two hydrogen atoms bonded to a silicon atom for the SiH containing compound. For the compound containing CC unsaturations, the core portion has a cage silsesquioxane structure such as $T^3_8$ and the terminal group has a polymerizable group, preferably an ethylenically unsaturated group.

US2003171477 discloses synthesis of organosiloxane oligomers by hydrolysis and polycondentation of organosilanes and further subjecting the product to a hydrosilylation using a hydrosilylation agent. Preferred embodiments of the silane compounds possess an alkoxy as the hydrolysable and polycondensable group, preferably a trialkoxysilane or a monoalkyl dialkoxysilane. Preferred embodiments of the hydrosilylation agent contain a vinyl group to participate in hydrosilylation and a resin-setting functional group such as aminoethyl methacrylate.

JP2004250585 discloses an insulating film and its preparation. A silicon-containing aromatic polymer is prepared by a hydrosilylation reaction of an aromatic compound possessing 3 or more ethynylene groups with a compound having 2 or more hydrosilyl groups. A preferred aromatic ring is tris(phenylethynyl)benzene and tris (dimethoxysilyl) benzene. It is preferable that 10 mol % of all ethynylene groups remain in the polymer to allow crosslinking through post treatments such as subjecting to heat.

US2006097393 discloses a low dielectric constant insulating material which comprises a borazine-silicon polymer which is prepared by a hydrosilylating polymerization of a borazine compound possessing an acetylene group and a silicon compound possessing at least two hydrosilyl groups or a cyclic silicon compound possessing at least two hydrosilyl groups. A preferred example of the borazine compound would be tripropynyl borazine or triethynyl borazine and a preferred example of the silicon compound would be m-bis(dimethylsilyl) naphthalene or that of a cyclic silicon compound would be 1,3,5,7-tetramethyl cyclotetrasiloxane.

JP2007084618 discloses a film-forming composition and its preparation based on subjecting one compound containing two or more acetylene groups to a hydrosilylation reaction with a polysiloxane compound possessing at least two or more hydrosilyl groups.

US2001053840/KR2014087908A discloses a dielectric film comprising a low-k material consisting of an organosilicate polymer prepared from a first component, an organosilane that contains hydrolyzable groups such as alkoxy and also non-hydrolyzable groups. A preferred embodiment for this organosilane would be a dialkylalkoxysilane. The second component, an organic bridged silane possessing hydrolysable and non-hydrolyzable groups. A partially hydrolyzed co-polymer product can be obtained by allowing the two components to react in water. If the non-hydrolyzable group of the second component is alkenyl, it may be further bridged by a hydrosilylation reaction.

US20190055645A1 discloses composition and formation of a silicon forming film whereby the films are deposited using the co-deposition of a first compound comprising a CC double or triple bond and a second compound comprising at least one Si—H bond. Exemplary compounds for the first component including tetravinylsilane and trivinylmethylsilane and exemplary compounds for the second component include trisilylamine and chloro-trisilylamine.

US2008/0081121A1 discloses a formulation and its synthesis based on a hydrosilylation or polymerization reaction of a tetrasubstituted silicon moiety containing at least two vinyl or ethynyl groups and a compound containing multiple SiH groups or multiple carbon-carbon unsaturated bonds that can be deposited using spin-on techniques. Exemplary embodiments include a silicon containing compound possessing at least 2 vinyl groups such as tetravinylsilane reacting with "Lupasol 11" a product of Arkema Yoshitomi to furnish a polymeric product.

KR2014087908 A discloses the preparation of ethylene-bridged polysilsesquioxanes by the hydrosilylation reaction of hydrodimethyl-silylated oligomethylsilsesquioxane and dimethylvinyl-silylated oligomethylsilsesquioxane in the presence of Karstedt's catalysts. The film derived from this product is crack- and shrinkage-free.

SUMMARY

Disclosed is a reaction mixture for producing a film-forming polycarbosilazane polymer, the reaction mixture comprising

- a first compound containing at least two unsaturated groups, and a second compound containing at least two hydrosilyl functional groups,
- wherein the reaction mixture is capable of forming the film-forming polycarbosilazane polymer utilizing hydrosilylation of the first compound by the second compound.

The disclosed reaction mixture may include one or more of the following aspects:

- the at least two unsaturated groups being vinyl or alkynyl group;
- the first compound including Tetravinylsilane, Dimethyldivinylsilane, Trivinylmethylsilane, 2,4,6-Trimethyl-2,4,6-trivinylcyclotrisilazane, 1,3,5-trivinyl-1,3,5-trimethylcyclotrisiloxane, and Octavinyloctasilasesquioxane;
- the at least two hydrosilyl functional groups being at least two —$SiH_2$— groups;
- the at least two —$SiH_2$— groups are three —$SiH_2$— groups;
- the at least two —$SiH_2$— groups are at least two —$SiH_3$ groups;
- the at least two —$SiH_3$ groups are three —$SiH_3$ groups;
- the second compound being selected from the group consisting of $Si_nH_m$, where n>1 and m=2n+2 or 2n (cyclic), $N(SiH_3)_3$, $(SiH_3)_2N—SiH_2—N(SiH_3)_2$, $(SiH_3)HN—SiH_2—N(SiH_3)_2$, $(SiH_2N—SiH_3)_3$, $HN(SiH_3)_2$, $H_2N(SiH_3)$, $N(SiH_2Me)_3$, $H_2N(SiH_2Me)$, $HN(SiH_3)$ $(SiH_2Me)$, $MeN(SiH_3)_2$, $Me_2N(SiH_3)$, $H_2N[Si(OMe)H_2]$, $H_2N[Si(OMe)_2H]$, and $H_2N[Si(OMe)H_2]$;
- the second compound being trisilylamine, $N(SiH_3)_3$ (CAS No.: 13862-16-3);
- further comprising a catalyst;
- the catalyst being selected from a metal-free or photoreactive catalyst;
- the catalyst being an azo compound selected from 2,2'-Azobis(2,4-dimethylvaleronitrile), azobisisobutyronitrile, or 1,1'-Azobis(cyclohexanecarbonitrile;
- the catalyst being an organic peroxide;
- the catalyst being selected from di-tert-butyl peroxide, benzoyl peroxide, or methyl ethyl ketone peroxide;
- the catalyst being 2,2'-Azobis(2,4-dimethylvaleronitrile);
- the catalyst being the catalyst being azobisisobutyronitrile;
- the catalyst being 1,1'-Azobis(cyclohexanecarbonitrile;
- the catalyst being di-tert-butyl peroxide;
- the catalyst being benzoyl peroxide;
- the catalyst being methyl ethyl ketone peroxide;
- further comprising a solvent or a solvent mixture selected from at least one of hydrocarbons, aromatic solvents selected from toluene, xylene or mesitylene, ethers selected from a tert-butyl ethers, THF or glymes, amines selected from trialkylamine or dialkylamine;
- further comprising a polysilane that contains more than two —$SiH_2R$ function groups, wherein R is H, a $C_1$ to $C_6$ linear, branched, or cyclic alkyl-group, a $C_1$ to $C_6$ linear, branched, or cyclic alkenyl-group, or a combination thereof; and
- the polysilane being selected from one or more of neopentasilane (or 2,2-disilyltrisilane) ($Si(SiH_3)_4$), n-tetrasilane ($SiH_3$ $(SiH_2)_2SiH_3$), 2-silyl-tetrasilane ($(SiH_3)_2$ $(SiH_2)_2SiH_3$), trisilylamine ($N(SiH_3)_3$), or trisilyamine derivatives selected from alkylamino-substituted trisilylamines of trisilylamines.

Also, disclosed is a method of forming a silicon and carbon containing film on a substrate comprising the steps of:

- producing a film-forming polycarbosilazane polymer by a polymerization of a reaction mixture of a first compound containing at least two unsaturated groups, and a second compound containing at least two —$SiH_2$— groups;
- forming a solution containing the film-forming polycarbosilazane polymer; and
- contacting the solution with the substrate via a spin-on coating, spray coating, dip coating, or slit coating technique to form the silicon and carbon containing film on the substrate.

The disclosed method may include one or more of the following aspects:

- further comprising the step of
- pre-baking the silicon and carbon containing film under $N_2$ atmosphere at a temperature ranging from approximately 50 °C to 400 °C; and
- subsequently hard baking the silicon and carbon containing film by a heat-induced radical reaction or a UV-Vis photo induced radical reaction in an atmosphere of $O_2$, $O_3$, $H_2O$, $H_2O_2$, $N_2O$, or NO, air, compressed air, or combinations thereof at a temperature range of 200-1000 °C to convert the silicon and carbon containing film to a SiOC or SiOCN containing film;
- the film-forming polycarbosilazane polymer being produced by hydrosilylation of the first compound by the second compound;
- the at least two unsaturated groups being vinyl or alkynyl group;
- the first compound including Tetravinylsilane, Trivinylmethylsilane, 2,4,6-Trimethyl-2,4,6-trivinylcyclotrisilazane, 1,3,5-trivinyl-1,3,5-trimethylcyclotrisiloxane, and Octavinyloctasilasesquioxane;
- the at least two hydrosilyl functional groups being at least two —$SiH_2$— groups;
- the at least two —$SiH_2$— groups are three —$SiH_2$— groups;
- the at least two —$SiH_2$— groups are at least two —$SiH_3$ groups;
- the at least two —$SiH_3$ groups are three-SiH3 groups;
- the second compound being selected from the group consisting of $Si_nH_m$, where n>1 and m=2n+2 or 2n (cyclic), $N(SiH_3)_3$, $(SiH_3)_2N—SiH_2—N(SiH_3)_2$, $(SiH_3)HN—SiH_2—N(SiH_3)_2$, $(SiH_2N—SiH_3)_3$, $HN(SiH_3)_2$, $H_2N(SiH_3)$, $N(SiH_2Me)_3$, $H_2N(SiH_2Me)$, $HN(SiH_3)(SiH_2Me)$, $MeN(SiH_3)_2$, $Me_2N(SiH_3)$, $H_2N[Si(OMe)H_2]$, $H_2N[Si(OMe)_2H]$, and $H_2N[Si(OMe)H_2]$;

the second compound being trisilylamine, $N(SiH_3)_3$ (CAS No.: 13862-16-3);

the step of the producing the film-forming polycarbosilazane polymer comprising the step of adding a catalyst selected from a metal-free or photoreactive catalyst to the reaction mixture;

the catalyst being an azo compound selected from 2,2'-Azobis (2,4-dimethylvaleronitrile), azobisisobutyronitrile, 1,1'-Azobis(cyclohexanecarbonitrile, or an organic peroxide selected from di-tert-butyl peroxide, benzoyl peroxide, methyl ethyl ketone peroxide;

further comprising the step of the forming the solution containing the film-forming polycarbosilazane polymer comprising the step of adding a solvent or a solvent mixture to the reaction mixture, wherein the solvent or the solvent mixture is selected from at least one of hydrocarbons, aromatic solvents selected from toluene, xylene or mesitylene, ethers selected from a tert-butyl ethers, THF or glymes, amines selected from trialkylamine or dialkylamine;

the step of the producing the film-forming polycarbosilazane polymer comprising the step of adding a polysilane that contains more than two —$SiH_2R$ function groups to the reaction mixture for enhancing the polymerization of the carbosilanes with amines, wherein R is H, a $C_1$ to $C_6$ linear, branched, or cyclic alkyl-group, a $C_1$ to $C_6$ linear, branched, or cyclic alkenyl-group, or a combination thereof; and the polysilane being selected from one or more of neopentasilane (or 2,2-disilyltrisilane) $(Si(SiH_3)_4)$, n-tetrasilane $(SiH_3(SiH_2)_2SiH_3)$, 2-silyl-tetrasilane $((SiH_3)_2(SiH_2)_2SiH_3)$, trisilylamine $(N(SiH_3)_3)$, or trisilyamine derivatives selected from alkylamino-substituted trisilylamines of trisilylamines.

Notation and Nomenclature

The following detailed description and claims utilize a number of abbreviations, symbols, and terms, which are generally well known in the art. Certain abbreviations, symbols, and terms are used throughout the following description and claims, and include:

As used herein, the indefinite article "a" or "an" means one or more.

As used herein, "about" or "around" or "approximately" in the text or in a claim means ±10% of the value stated.

As used herein, "room temperature" in the text or in a claim means from approximately 20 °C to approximately 25 °C The term "ambient temperature" refers to an environment temperature approximately 20 °C to approximately 25 °C The term "substrate" refers to a material or materials on which a process is conducted. The substrate may refer to a wafer having a material or materials on which a process is conducted. The substrates may be any suitable wafer used in semiconductor, photovoltaic, flat panel, or LCD-TFT device manufacturing. The substrate may also have one or more layers of differing materials already deposited upon it from a previous manufacturing step. For example, the wafers may include silicon layers (e.g., crystalline, amorphous, porous, etc.), silicon containing layers (e.g., $SiO_2$, SiN, SiON, SiCOH, etc.), metal containing layers (e.g., copper, cobalt, ruthenium, tungsten, platinum, palladium, nickel, ruthenium, gold, etc.) or combinations thereof. Furthermore, the substrate may be planar or patterned. The substrate may be an organic patterned photoresist film. The substrate may include layers of oxides which are used as dielectric materials in MEMS, 3D NAND, MIM, DRAM, or FeRam device applications (for example, $ZrO_2$ based materials, $HfO_2$ based materials, $TiO_2$ based materials, rare earth oxide based materials, ternary oxide based materials, etc.) or nitride-based films (for example, TaN, TiN, NbN) that are used as electrodes. One of ordinary skill in the art will recognize that the terms "film" or "layer" used herein refer to a thickness of some material laid on or spread over a surface and that the surface may be a trench or a line. Throughout the specification and claims, the wafer and any associated layers thereon are referred to as substrates.

The term "wafer" or "patterned wafer" refers to a wafer having a stack of films on a substrate and at least the top-most film having topographic features that have been created in steps prior to the deposition of the low-k film.

The term "aspect ratio" refers to a ratio of the height of a trench (or aperture) to the width of the trench (or the diameter of the aperture).

Note that herein, the terms "film" and "layer" may be used interchangeably. It is understood that a film may correspond to, or related to a layer, and that the layer may refer to the film. Furthermore, one of ordinary skill in the art will recognize that the terms "film" or "layer" used herein refer to a thickness of some material laid on or spread over a surface and that the surface may range from as large as the entire wafer to as small as a trench or a line.

As used herein, the term "carbosilane" refers to a linear, branched, or cyclic molecule containing Si, C and H atoms and at least two —$SiH_2R$ groups and may be written as $R_xSi_yH_z$ in a general formula, where x, y and z≥1.

As used herein, the term "polycarbosilazane" refers to an oligomer/polymer formed by at least two carbosilanes attached by a Si—NR—Si bonding. The polycarbosilazane is a linear, branched, or crosslinked polymer containing Si, C, H and N atoms and Si—NR—Si bonds.

As used herein, the term "formulation" refers to a polymer solution comprising of an oligocarbosilazane, polycarbosilazane, polysilazane, polycarbosilane and polysilane in a solvent.

As used herein, the term "film-forming composition" refers to a mixture of components used for deposition that may contain precursors, catalysts, surfactants, wetting agents, and other polymers, oligomers or monomers such as, but is not limited to, polysilazane, polycarbosilanes, polysilanes, etc.

Please note that the silicon-containing films, such as Si, SiN, SiO, SiOC, SiON, SiCON, are listed throughout the specification and claims without reference to their proper stoichiometry. The silicon-containing films may also include dopants, such as B, P, As, Ga and/or Ge. The fact that the film contains some residual hydrogen is also omitted from the film composition description. For instance, an SiOC film may contain residual H.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
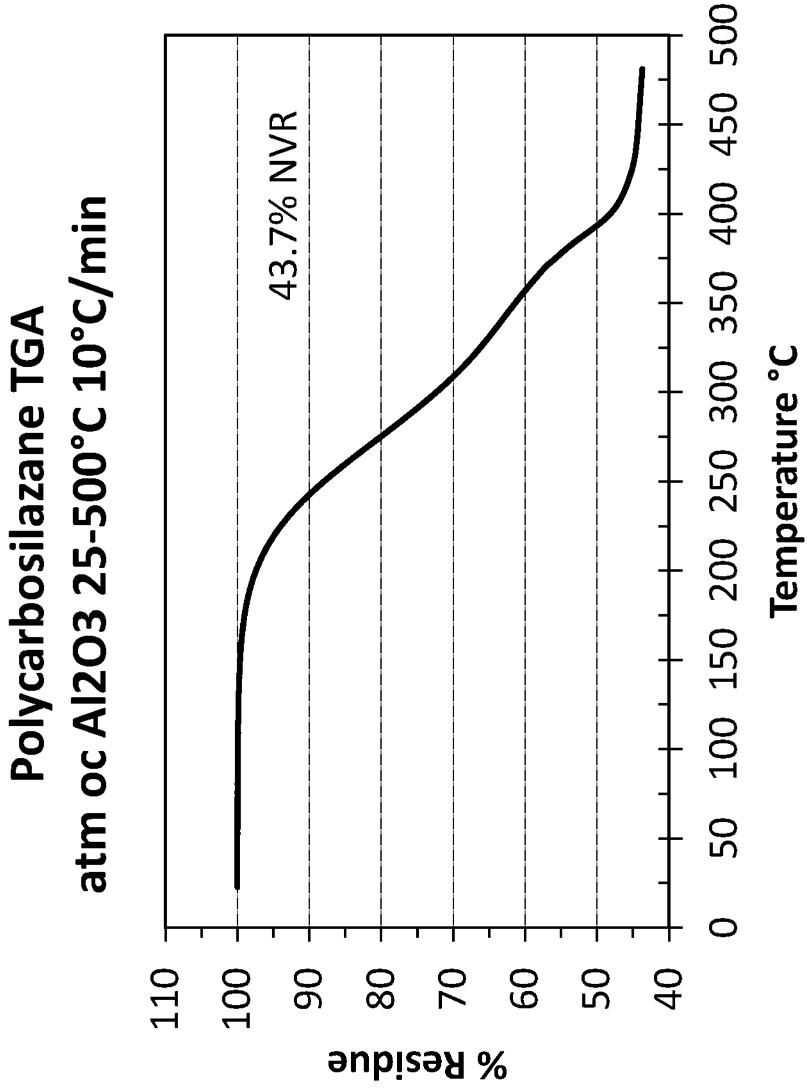
FIG. 1 is thermogravimetric analysis (TGA) of Low-k 1.

Disclosed are silicon and carbon containing film-forming compositions comprising a polycarbosilazane containing polymer formulation for deposition of Si-containing low-k dielectric film, methods of synthesizing the polycarbosilazanes and methods of using the silicon and carbon containing film-forming compositions to deposit silicon and carbon containing films for manufacturing SiOC, SiOCN or SiCN devices or the like. Particularly, the disclosed methods are spin-on deposition (SOD) of the silicon and carbon containing film-forming composition comprising the polycarbosilazane containing formulation following pre-baking (or curing) and hard baking processes to form a low-k dielectric film, such as a SiOC, SiOCN or SiCN film. The disclosed revers to spinnable composition, synthesis methods and application of novel silazane and/or carbosilanes composition that are useful for making dielectric films having a low dielectric constant.

The disclosed polycarbosilazane containing polymers are new low-k materials derived by hydrosilylation of a first compound containing unsaturated groups with a second compound containing hydrosilyl functional groups and the subsequent formulation of the resulting polymers. More specifically, the disclosed are preparation of polycarbosilazanes or polycarbosilazane polymers utilizing hydrosilylation of the first compound containing at least two unsaturated groups by the second compound containing at least two hydrosilyl functional groups. This methodology may be used to furnish materials for spin-coating application as low-dielectric constant thin films.

The at least two unsaturated groups in the disclosed first compound may be vinyl or alkynyl groups.

The disclosed first compounds containing at least two unsaturated groups may include Tetravinylsilane, Trivinylmethylsilane, Dimethyldivinylsilane, 2,4,6,8-Tetravinyl-2,4,6,8-tetramethylcyclotetrasilazane, 2,4,6-Trimethyl-2,4,6-trivinylcyclotrisilazane, 2,4,6,8-Tetravinyl-2,4,6,8-tetramethylcyclotetrasiloxane, 1,3,5-Trivinyl-1,3,5-trimethylcyclotrisiloxane, vinyltriisopropenoxysilane and Octavinyloctasilasesquioxane.

The at least two hydrosilyl functional groups in the disclosed second compound are at least two $—SiH_2—$ groups, preferably three $—SiH_2—$ groups, more preferably at least two $—SiH_3$ groups, even more preferably three $—SiH_3$ groups. The disclosed second compound containing at least two $—SiH_2—$ groups may be i) no bridges, such as a disilanes $RSiH_2—SiH_2—R$; ii) bridged by Nitrogen, such as $(SiH_3)3N$, $(MeH_2Si)_3N$, $SiH_3—N(Me)—SiH_3$, etc.; and iii) bridged by $C_xH_y$ chain, such as $SiH_3—CH_2—SiH$ polycarbosilazane containing polymer, $SiH_3—CH_2—CH_2—SiH_3$, $(SiH_3)_3CH$, etc. In this way, $Si—C_xH_y—Si$ backbone of the resulting polycarbosilazane containing polymer is maintained and remains intact under the hydrosilylation conditions.

Exemplary disclosed second compound containing at least two hydrosilyl functional groups include $Si_nH_m$, where n>1 and m=2n+2 or 2n (cyclic), $N(SiH_3)_3$, $(SiH_3)_2N—SiH_2—N(SiH_3)_2$, $(SiH_3)HN—SiH_2—N(SiH_3)_2$, $(SiH_2N—SiH_3)_3$, $HN(SiH_3)_2$, $H_2N(SiH_3)$, $N(SiH_2Me)_3$, $H_2N(SiH_2Me)$, $HN(SiH_3)(SiH_2Me)$, $MeN(SiH_3)_2$, $Me_2N(SiH_3)$, $H_2N[Si(OMe)H_2]$, $H_2N[Si(OMe)_2H]$, $H_2N[Si(OMe)H_2]$, or the like.

In some embodiments, the disclosed second compound containing at least two hydrosilyl functional groups is trisilylamine (TSA) $N(SiH_3)_3$ (CAS No. 13862-16-3).

The disclosed synthesis methods comprise mixing of the first compound that contains at least two unsaturated groups with the second compound that contains at least two $—SiH_2—$ groups in liquid phase and possibly, with a catalyst, which is preferably a metal-free or photoreactive catalyst, thereby resulting in a polycarbosilazane polymer.

The disclosed silicon and carbon containing film-forming composition contains the resulting or synthesized polycarbosilazane polymer according to the disclosed synthesis methods and at least a solvent, the combination of which may be used as a coating solution which may then be applied to a substrate, ideally by a spin-coating technique such as a spin-on coating, spray coating, dip coating, slit coating technique, or the like.

In one embodiment of the resulting polycarbosilazane polymer, Scheme 1, trisilylamine (TSA) moieties are bridged with other TSA moieties by a carbon frame-work resulting in ethylene-bridged polycarbosilazanes. The resulting ethylene-bridged polycarbosilazanes may be formulated and the resulting polymer formulation may be applied to the coating solution as described above. Exemplary ethylene-bridged polycarbosilazanes of Scheme 1 includes:

a. Low-k 1: TSA mixes with tetravinylsilane forming Low-k 1 polymer:

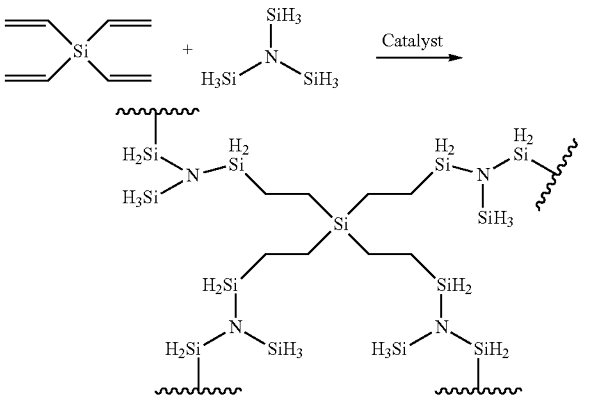

b. Low-k 2: TSA mixes with trivinylmethylsilane forming Low-k 2 polymer:

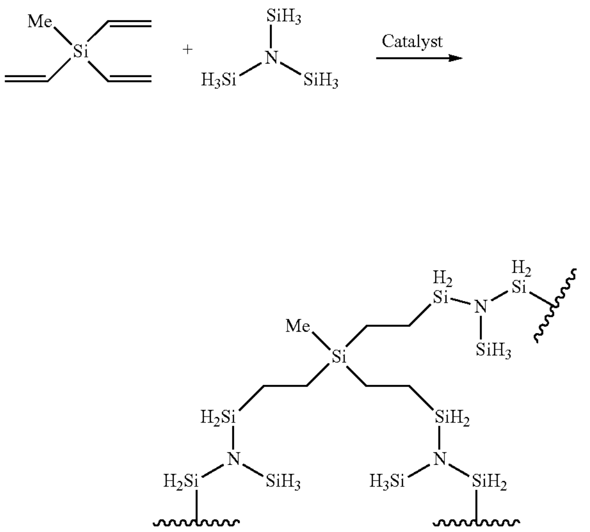

c. Low-k 3: TSA mixes with trivinylmethylsilane and Diisopropylaminotrisilylamine forming a Low-k 3 polymer:

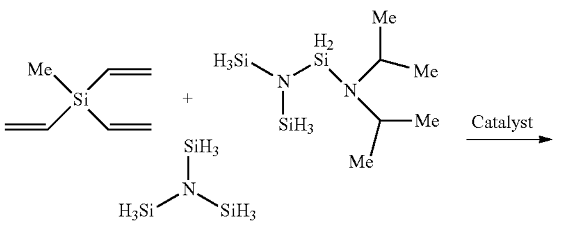

-continued

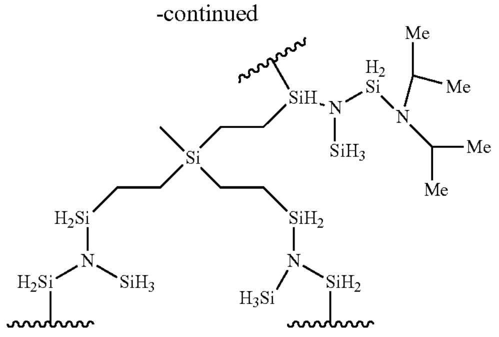

In another embodiment of the resulting polycarbosilazane polymer, Scheme 2, TSA mixes with cyclic silazane possessing vinyl groups on the silicon. TSA moieties are bridged with other TSA moieties by a cyclic silazane carbon frame-work resulting in ethylene-bridged cyclic polycarbosilazanes. The resulting ethylene-bridged cyclic polycarbosilazanes may be formulated and the resulting polymer formulation may be applied to the coating solution as described above. Exemplary ethylene-bridged cyclic polycarbosilazanes of Scheme 2 includes:

a. Low-k 4: TSA mixes with 2,4,6,8-Tetravinyl-2,4,6,8-tetramethylcyclotetrasilazane forming a Low-k 4 polymer:

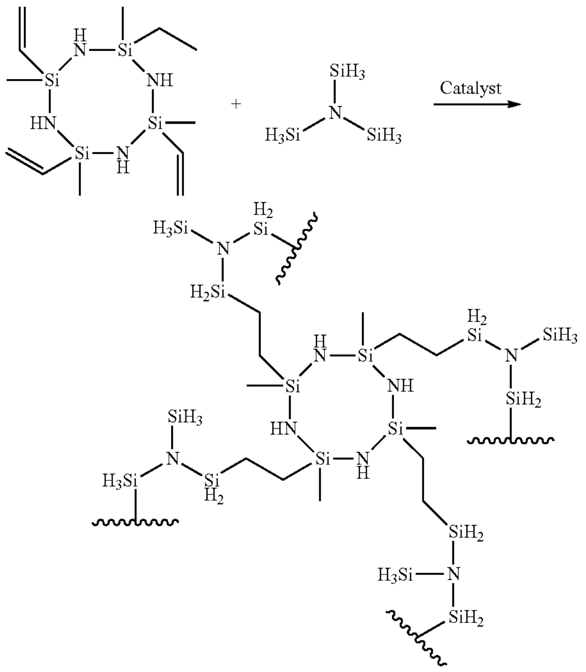

b. Low-k 5: TSA mixes with 2,4,6-Trimethyl-2,4,6-trivinylcyclotrisilazane forming a Low-k 5 polymer:

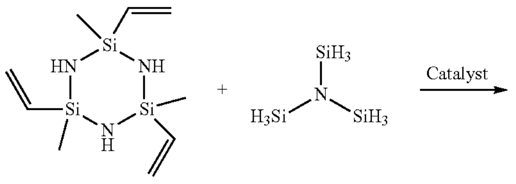

-continued

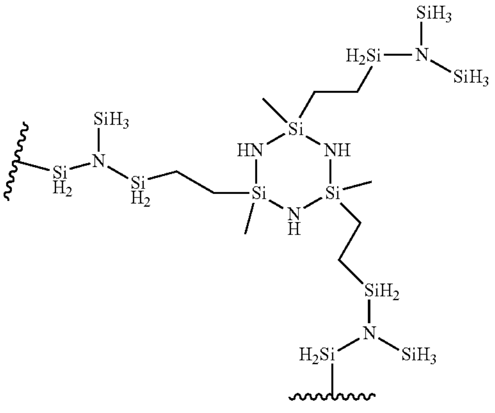

In another embodiment of the resulting polycarbosilazane polymer, Scheme 3, TSA mixes with cyclic siloxanes possessing vinyl groups on the silicon. TSA moieties are bridged with other TSA moieties by a cyclic siloxane carbon frame-work resulting in ethylene-bridged cyclic polycarbosilazanes. The resulting ethylene-bridged cyclic polycarbosilazanes may be formulated and the resulting formulation may be applied to the coating solution as described above. Exemplary ethylene-bridged cyclic polycarbosilazanes of Scheme 3 includes:

a. Low-k 6: TSA mixes with 2,4,6,8-Tetravinyl-2,4,6,8-tetramethylcyclotetrasiloxane forming a Low-k 6 polymer:

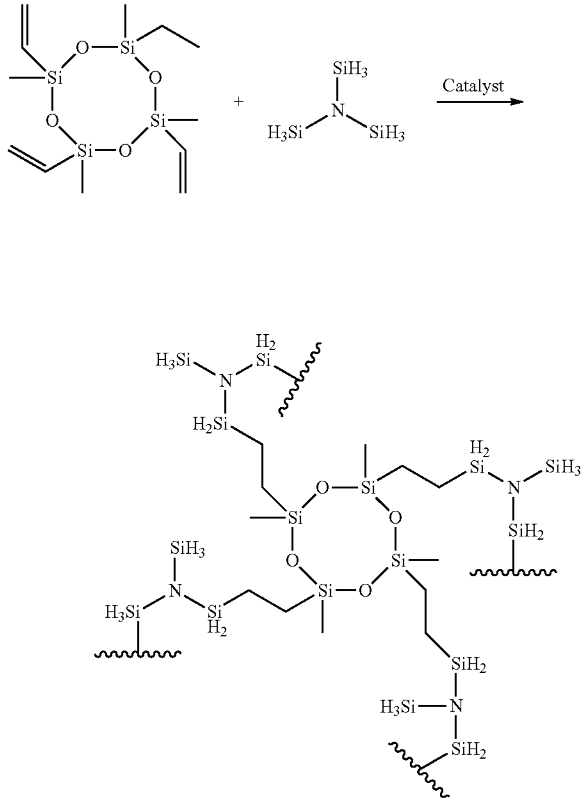

b. Low-k 7: TSA mixes with 1,3,5-Trivinyl-1,3,5-trimethylcyclotrisiloxane forming a Low-k 7 polymer:

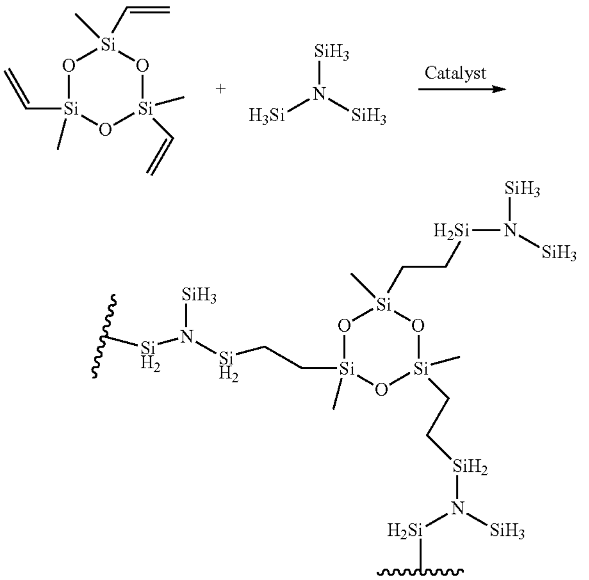

c. A further example of a vinyl functionalized substrate that could undergo an analogous chemical reaction with TSA is octavinyloctasilasesquioxane shown below.

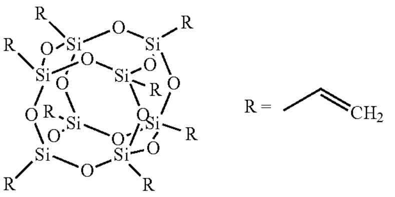

The catalyst used herein preferably is a metal-free or photoreactive catalyst, for example, azo compounds such as 2,2'-azobis(2,4-dimethylvaleronitrile), azobisisobutyronitrile, 1,1'-Azobis(cyclohexanecarbonitrile but is not limited to. Other molecules such as organic peroxides may also be used as catalyst here, for example di-tert-butyl peroxide, benzoyl peroxide, methyl ethyl ketone peroxide but are not limited to.

The reaction temperature range could be from approximately 0 °C to approximately 100 °C, preferably from approximately 20 °C to approximately 80 °C, more preferably from approximately 50 °C to approximately 60 °C, even more preferably approximately 55 °C. In some embodiments, the temperature range may be set depending on the catalyst suitable temperature.

The preferred reaction pressure range is about from 0 to 20 psig.

The disclosed synthesis methods may be scaled up to produce a large amount of the product. For example, scaled up to approximately 1 kg to approximately 100 kg.

The disclosed polycarbosilazane containing formulation are suitable for being used in a coating formulation, preferably a spin-on coating or SOD applications due to at least partially to the benefits of Si—C bonds.

The disclosed silicon and carbon containing film-forming composition typically contains 1-20% by weight of the non-volatile polycarbosilazane polymer in a solvent or solvent mixture, preferably 2% to 10%. The solvent or solvent mixture is selected from at least one of hydrocarbons, aromatic solvents such as toluene, xylene or mesitylene, ethers such as a tert-butyl ethers, THF or glymes, amines such as trialkylamine or dialkylamine, etc. The disclosed silicon and carbon containing film-forming compositions may include other components to improve the overall resulting film properties, improve the wettability to the surface, tune the final film composition, and reduce the shrinkage of the film during the curing and baking steps. As such, the disclosed silicon and carbon containing film-forming compositions may contain catalysts, surfactants, wetting agents, and other polymers, oligomers or monomers such as, but is not limited to, polysilazane, polycarbosilanes, polysilanes, or the like.

The disclosed silicon and carbon containing film-forming compositions may contain other monomers, such as polysilanes. The polysilanes contain no carbon chain and have at least three —$SiH_2R$ groups favorable of forming branched and/or crosslinked polymers along with the polycarbosilazanes. Exemplary polysilanes include neopentasilane ($Si(SiH_3)_4$), n-tetrasilane ($SiH_3(SiH_2)_2SiH_3$), 2-silyl-tetrasilane ($(SiH_3)_2(SiH_2)_2SiH_3$), trisilylamine ($N(SiH_3)_3$) or trisilyamine derivatives such as alkylamino-substituted trisilylamines or oligomers of trisilylamines, including but not limited to:

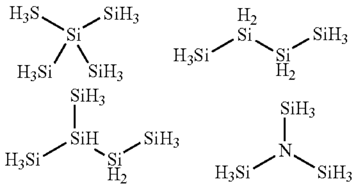

Also disclosed are methods of using the disclosed silicon and carbon containing film-forming compositions in coating deposition methods, such as spin-on coating, spray coating, dip coating or slit coating techniques. To be suitable for coating methods, the disclosed polycarbosilazanes should have a molecular weight ranging from approximately 300 Da to approximately 1,000,000 Da, preferably from approximately 500 Da to approximately 100,000 Da, and more preferably from approximately 1,000 Da to approximately 50,000 Da.

Prior to spin coating, the substrate may be exposed to a treatment and surface modification aiming at improving the wettability of the silicon and carbon containing film-forming composition on the substrate. This treatment may be a mere solvent exposure, or a chemical treatment aiming at modifying the chemical surface composition.

Spin-on-deposition (SOD) generally consists of three steps: spin-on coating, soft baking (or curing), and hard baking. A liquid form or solution of the disclosed polycarbosilazane containing formulation may be applied directly to the center of a substrate. The solution is then evenly distributed to the entire substrate during a spinning process forming a film on the substrate. A film thickness may be controlled by adjusting a concentration of the disclosed polycarbosilazane containing formulation, the solvent or solvent mixture choice, and the spin rate or rates if the spin recipe has several steps. The as-deposited film may be then baked on the hot plate or other heating equipment for a period of time to vaporize the solvent(s) or volatile components of the film. The soft bake temperature may be varied from 50 to 400 °C, which depends on the property of the solvent. The soft bake may be carried out in an inert atmosphere to the polycarbosilazane film, or to an atmosphere that contains $O_2$ and/or $H_2O$, leading to a pre-reaction of the polycarbosilazane film. Eventually, the hard bake process may be carried out by annealing the substrate in an oxidizing atmosphere, such as $O_2$, $O_3$, $H_2O$, $H_2O_2$, $N_2O$, NO, air, compressed air and combination thereof, at a temperature ranging from 200 to 1000 °C. The film quality may be improved by optimizing a ramping rate, temperature, annealing duration, and oxidizer combinations, etc. The extent of the conversion of the silazane bridges to siloxane bridges may be controlled by the annealing temperature, the composition of the annealing atmosphere, and by the annealing time. Alternatively, the as-deposited film may be dried at room temperature for a period of time to vaporize the solvent or volatile components of the film or dried by force-drying or baking or by the use of one or a combination of any following suitable process including thermal curing and irradiations, such as, ion irritation, electron irradiation, UV and/or visible light irradiation, etc.

The silicon-containing films resulting from the processes discussed above may include SiOC, SiOCN, SINC. However, the polycarbosilazane polymer solution may be mixed with other polymers (co-reactants) to form films containing other elements as well such as B, Ge, Ga, Al, Zr, Hf, Ti, Nb, V, Ta. One of ordinary skill in the art will recognize that by judicial selection of the appropriate polycarbosilazane containing formulation and co-reactants, the desired film composition may be obtained.

Unless deliberately added to the disclosed silicon and carbon containing film-forming compositions, the concentration of trace metals and metalloids in the silicon and carbon containing film-forming composition may each range from approximately 0 ppbw to approximately 500 ppbw, preferably from approximately 0 ppbw to approximately 100 ppbw, and more preferably from approximately 0 ppbw to approximately 10 ppbw. One of ordinary skill in the art will recognize that extraction using a reagent, such as hydrofluoric, nitric or sulfuric acid, and analysis by atomic absorption spectroscopy, x-ray fluorescence spectroscopy, or similar analytical techniques may be used to determine the trace metal and metalloid concentrations.

EXAMPLES

A more detailed description of the disclosed methods through examples is provided as follows. However, the disclosed methods is not limited to presented examples in any way and process conditions, process gas mixture, combination and proportion of gases in the gas mixture, workpiece and plasma etching chamber itself may be altered.

In the following Examples, the primary plasma etching source may be a CCP plasma but may also include other sources such as ICP, microwave, ECR, etc. The plasma may be used in a continuous source or as a pulsed plasma of a certain frequency and duty cycle. Additional fluorocarbon gases may be added to slightly tune the etching performance. Additional inert gases may be added such as Kr, Xe, Ne, Ne as well as hydrogen source gases such as $H_2$, and hydrocarbons. The mask material may include TiN or other metal nitride materials, SiN, Si, carbon materials, or the like.

Example 1 SiOC Low-k Film Formed by SOD Using Low-k 1

Preparation of Low-k 1 According to Scheme 1

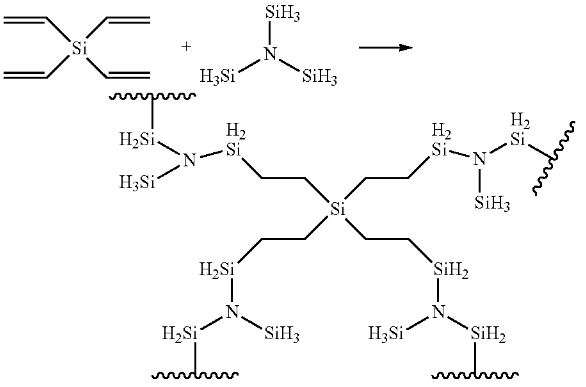

(Low-k 1)

A 100 mL glass pressure tube equipped with a magnetic stir bar and Teflon plug was charged with tetravinylsilane, TSA, catalyst and solvent. The mixture was stirred, heated and then allowed to cool to room temperature. Volatile components were removed en vacuo to furnish a colorless, viscous oil. Thermogravimetric analysis (TGA) (25-500 °C 10 °C/min) suggested 43.7% of non-volatile residue (NVR) (FIG. 1). Analyses by $^1H$, $^{29}Si$ and $^{13}C$ NMR (not shown) were consistent with the expected structure type as the major components.

SiOC Low-k Film Formed by SOD Using Low-k 1

Figure 2:
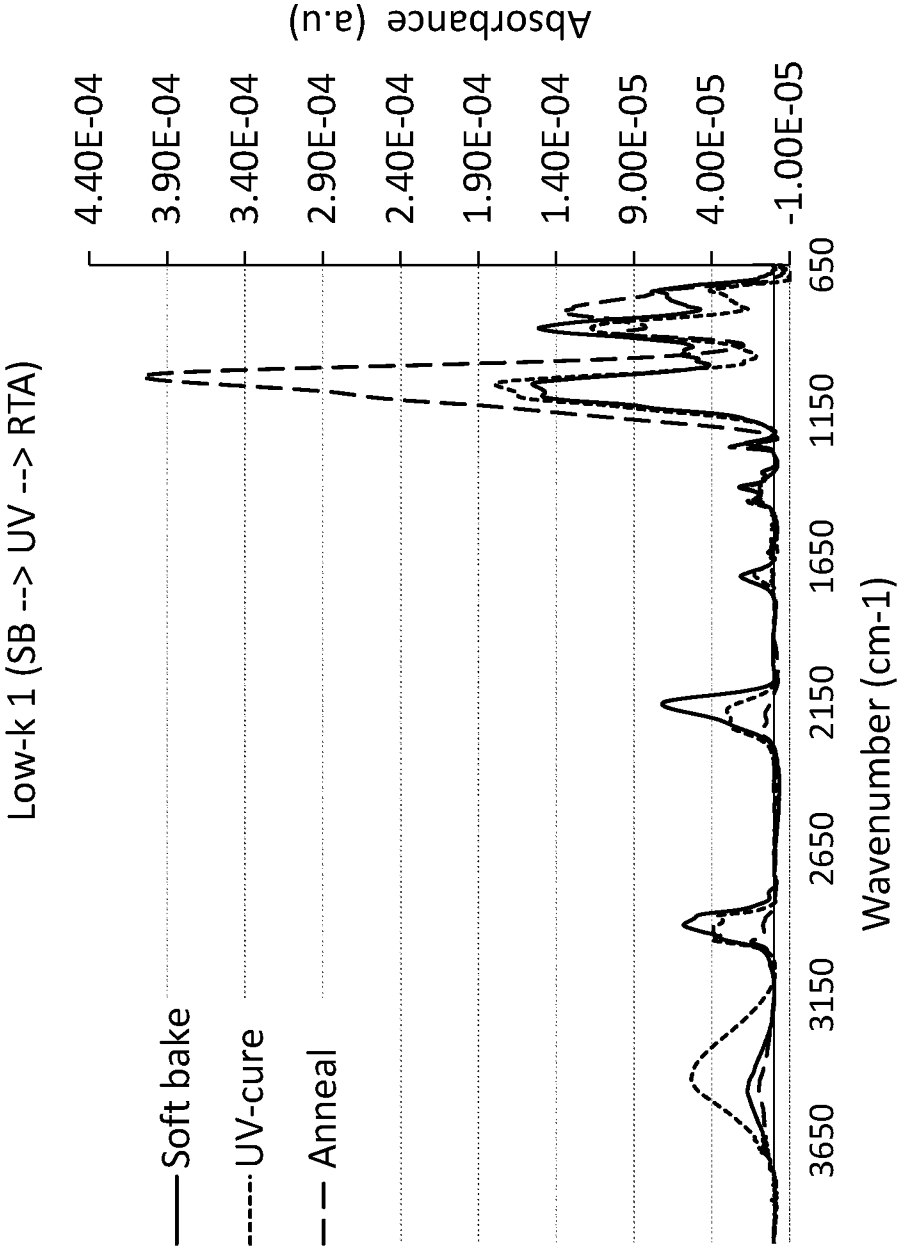
FIG. 2 is a FTIR spectrum (1,500-650 $cm^{-1}$) comparison of soft-baked, UV-cured and annealed of the SOD of SiOC low-k film formed by TSA and tetravinylsilane precursors of Example 1.

A thin film was formed by SOD using the product of a polymer formulation Low-k 1 made by TSA and tetravinylsilane precursors. The SOD film was spun at 2000 rpm, for 60 sec, using a spin coater (Laurel WS-650 Mz-8NPPB). The SOD formed film was then soft baked at 200 °C for 5 min under compressed air atmosphere and UV cured at 1000 $mJ/cm^2$ in compressed air at room temperature (using UV lamp, wavelength 172 nm). Finally, the SOD film was annealed at 600 °C for 5 min in $N_2$. FIG. 2 is a FTIR spectrum (1,500-650 $cm^{-1}$) comparison of soft-baked, UV-cured and annealed of the SOD of SiOC low-k film formed by TSA and tetravinylsilane precursors. As shown, the Si—H bond (at ~2150 $cm^{-1}$) are converted into Si—OH after UV-cure and further converted into Si—O—Si around 1,150-950 $cm^{-1}$ after anneal. Thus, Si—$(CH_2)_2$—Si backbone structure is maintained.

TABLE 1

FTIR Peak Assignments from FIG. 2

| Wavenumber ($cm^{-1}$) | Assignment |
|---|---|
| 950-930 | Si—$H_x$ bending |
| 1,150-950 | Si—O—Si stretch |
| 1,175 | —NH— deformation |
| 1260 | $CH_3$ bending in Si—$CH_3$ |
| 1,360 | $CH_2$ bending in Si—$CH_2$—Si |
| 1400 | —$CH_2$ bending in Si—$(CH_2)_2$—Si |
| 2,120-2150 | Si—$H_x$ stretch |
| 2,940-2,880 | $CH_x$ stretches |
| 3,377 | N—H stretch in Si—NH—Si |
| 3,473 | N—H stretch in Si—$NH_2$ |
| 3,700-3,400 | broad, O—H stretch in Si—OH stretch (free and H-bonded) |

A Scanning Electron Microscopy (SEM) image of a gap filled trench after annealing was measured (not shown). The gap fill is performed on a Si pattern substrate with a $SiO_A$ liner. The pattern structure has an aspect ratio of ~10:1 (height ~1.3 μm and width ~130 nm). Low-k 1 formulation exhibits a complete gap filling, without defects, that is, no delamination, crack or voids are observed.

Electrical properties of the SOD film after annealing were collected using a mercury probe, the dielectric constant k is 3.1 (at the frequency of 1 MHZ).

Example 2 SiOC Low-k Film Formed by SOD Using Low-k 2

Preparation of Low-k 2 According to According to Scheme 1

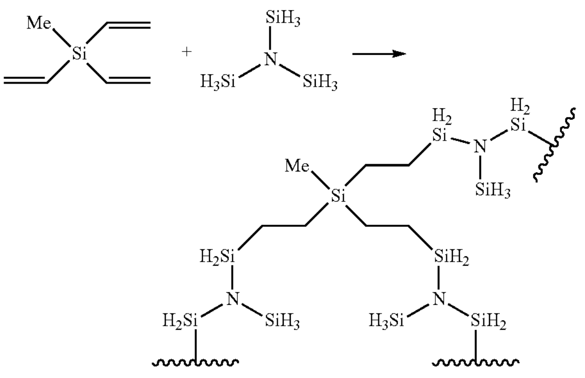

(Low-k 2)

Figure 3:
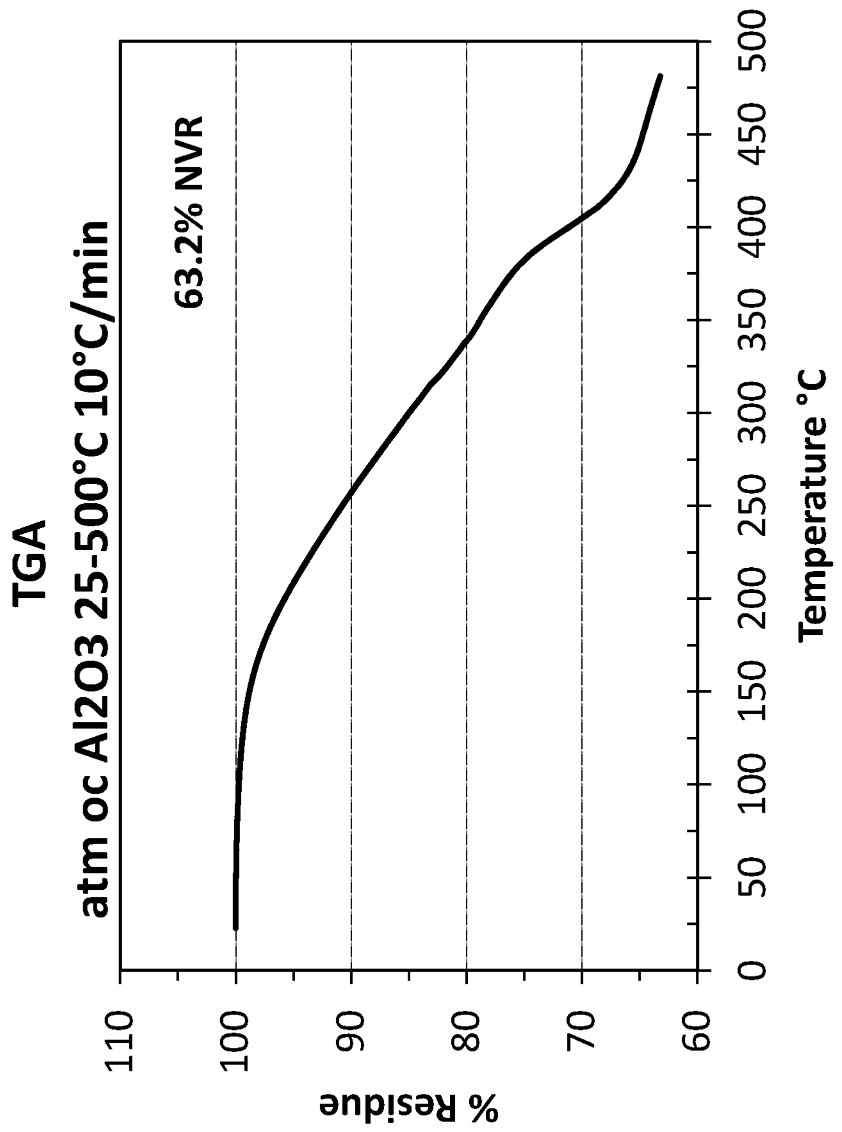
FIG. 3 is TGA of Low-k 2.

A 100 mL glass pressure tube equipped with a magnetic stir bar and Teflon plug was charged with Trivinylmethylsilane, TSA, catalyst and solvent. The mixture was stirred, heated and then allowed to cool to room temperature. Volatile components were removed en vacuo to furnish a colorless, viscous oil. Thermogravimetric analysis (25-500 °C 10 °C/min) suggested 63.2% of non-volatile residue (NVR) (FIG. 3). Analysis by $^1H$, $^{29}Si$ and $^{13}C$ NMR (not shown) were consistent with the expected structure type as the major component.

SiOC Low-k Film Formed by SOD Using Low-k 2

A thin film was formed by SOD using a polymer formulation Low-k 2 made by TSA and trivinylmethylsilane precursors. The SOD film was spun at 2000 rpm, for 60 sec, using a spin coater Laurel WS-650 Mz-8NPPB. The SOD formed film was then prebaked at 200 °C for 5 min under $N_2$ atmosphere and UV cured at 1000 $mJ/cm^2$ in compressed air at room temperature (using UV lamp, wavelength 172 nm). Finally the SOD film was annealed at 600 °C for 5 min in $N_2$.

A SEM image of the gap filled trench after annealing was taken (not shown). The gap fill is performed on a Si pattern substrate with a $SiO_2$ liner. The pattern structure has an aspect ratio of ~10:1 (height ~1.3 μm and width ~130 nm). Low-k 2 formulation exhibits a complete gap filling, without defects, that is, no delamination, crack or voids are observed.

Electrical properties of the SOD film after annealing were collected using a mercury probe, the dielectric constant k is 3.0 (at the frequency of 1 MHZ). Mechanical properties were measured by nanoindentation: after annealing the Young's Modulus measured is ~14 GPa and the hardness is ~1.2 GPa.

Example 3 SiOC Low-k Film Formed by SOD Using Low-k 5

Preparation of Low-k 5 According to Scheme 2

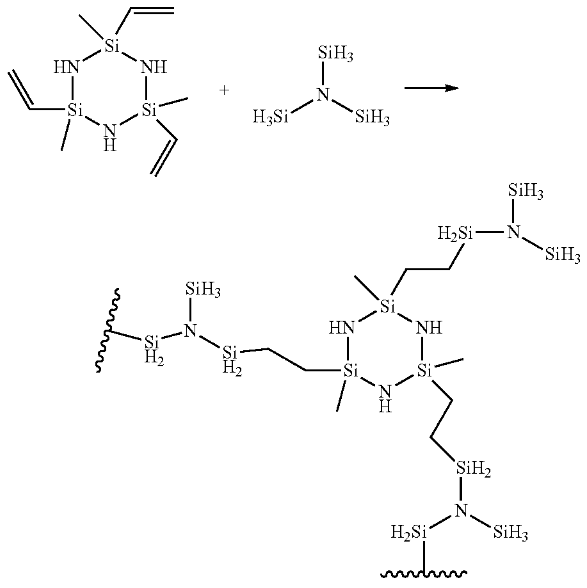

(Low-k 5)

Figure 4:
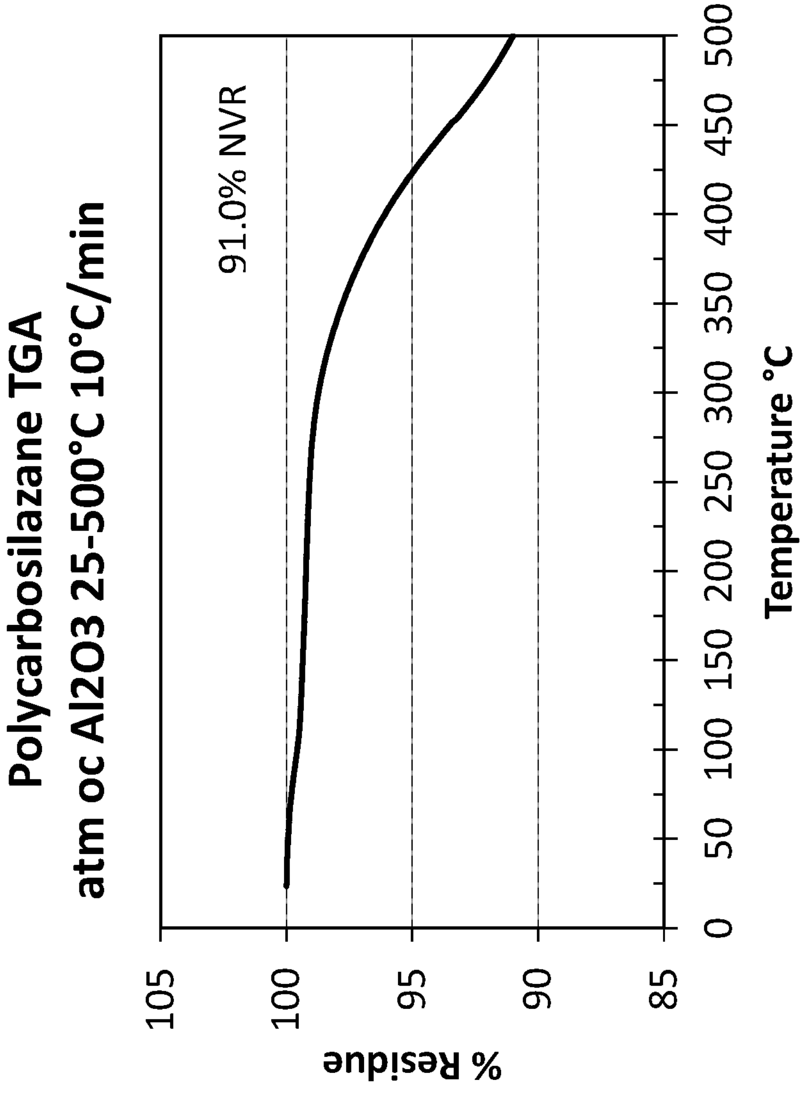
FIG. 4 is TGA of Low-k 3.

A 100 mL glass pressure tube equipped with a magnetic stir bar and Teflon plug was charged with 2,4,6-Trimethyl-2,4,6-trivinylcyclotrisilazane, TSA, catalyst and solvent. The mixture was stirred, heated and then allowed to cool to room temperature. Volatile components were removed en vacuo to furnish a colorless, viscous oil. Thermogravimetric analysis (25-500 °C 10 °C/min) suggested 91.0% of non-volatile residue (NVR) (FIG. 4). Analysis by $^{1}H$ and $^{29}Si$ NMR (not shown) were consistent with the expected structure type as the major component together with a minor component with some vinyl groups remaining unreacted.

SiOC Low-k Film Formed by SOD Using Low-k 5

Figure 5:
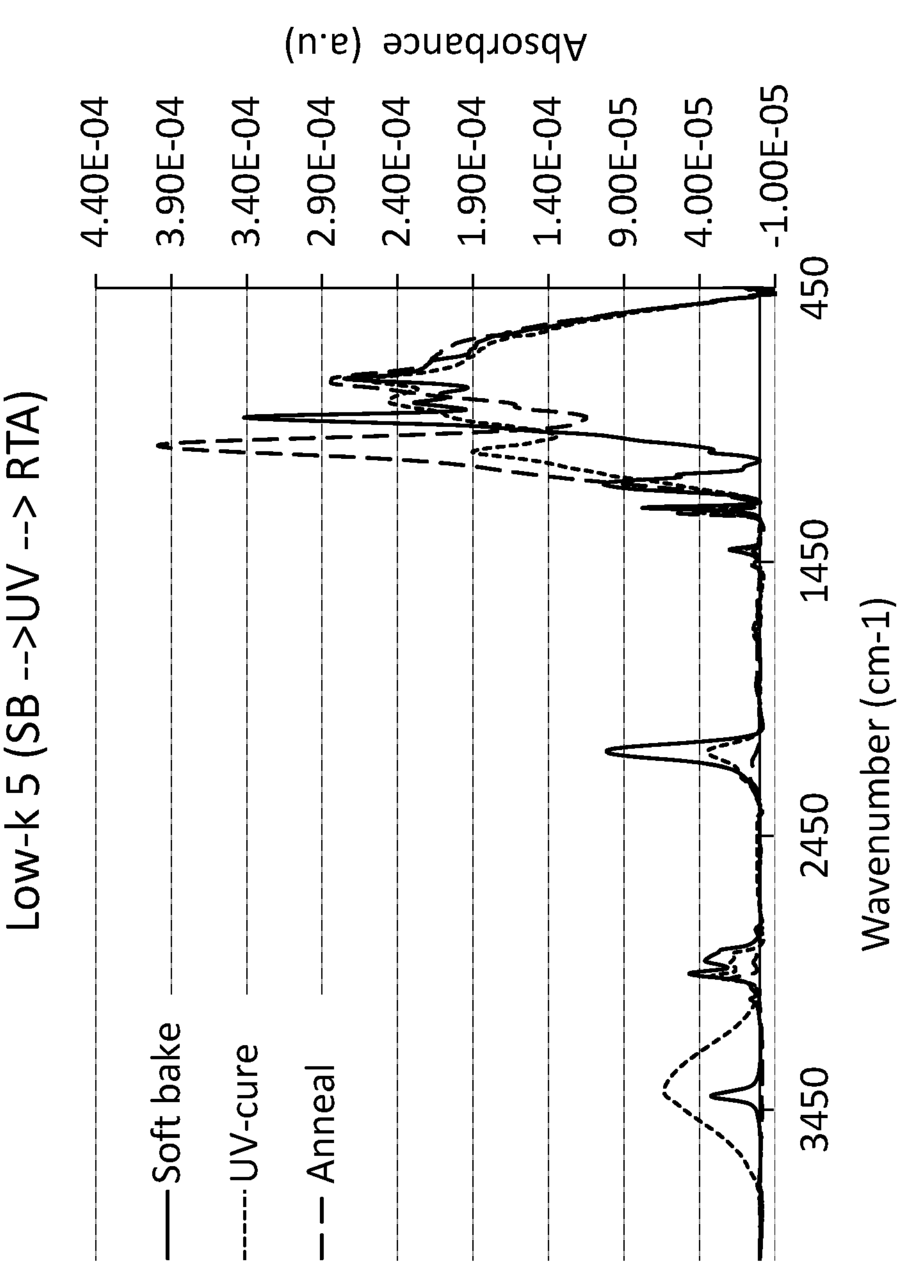
FIG. 5 is a FTIR spectrum (1,500-650 $cm^{-1}$) comparison of pre-baked, UV-cured and annealed of the SOD of SiOC low-k film formed by TSA and (TriVinyl-TriMethyl-Cyclo-TriSilazane) precursors of Example 3.

A thin film was formed by SOD using a polymer formulation Low k 5 made by TSA and 2,4,6-Trimethyl-2,4,6-trivinylcyclotrisilazane precursors. The film was spun at 2000 rpm, for 60 sec, using a spin coater (Laurel WS-650 Mz-8NPPB). The SOD formed film was then soft baked at 200 °C for 5 min under compressed air atmosphere and UV cured at 1000 mJ/$cm^2$ in compressed air at room temperature (using UV lamp, wavelength 172 nm). Finally the SOD film was annealed at 600 °C for 5 min in $N_2$. FIG. 5 is a FTIR spectrum (1,500-650 $cm^{-1}$) comparison of pre-baked, UV-cured and annealed of the SOD of SiOC low-k film formed by TSA and 2,4,6-Trimethyl-2,4,6-trivinylcyclotrisilazane precursors. As shown, the Si—H bond (at ~2150 $cm^{-1}$) are converted into Si—OH after UV-cure and further converted into Si—O—Si around 1,150-950 $cm^{-1}$ after anneal. Si—$(CH_2)_2$—Si backbone structure is maintained.

A SEM image of the gap filled trench after annealing was taken (not shown). The gap fill is performed on a Si pattern substrate with a $SiO_2$ liner. The pattern structure has an aspect ratio of ~10:1 (height ~1.3 μm and width ~130 nm). Low-k 3 formulation exhibits a complete gap filling, without defects, that is, no delamination, crack or voids are observed.

Electrical properties of the SOD film after annealing were collected using a mercury probe, the dielectric constant k is 2.7 (at the frequency of 1 MHZ). Mechanical properties were measured by nanoindentation: after annealing the Young's Modulus measured is ~10 GPa and the hardness is ~1.2 GPa.

Example 4 SiOC Low-k Film Formed by SOD Using Low-k 7

Preparation of Low-k 7 According to Scheme 3

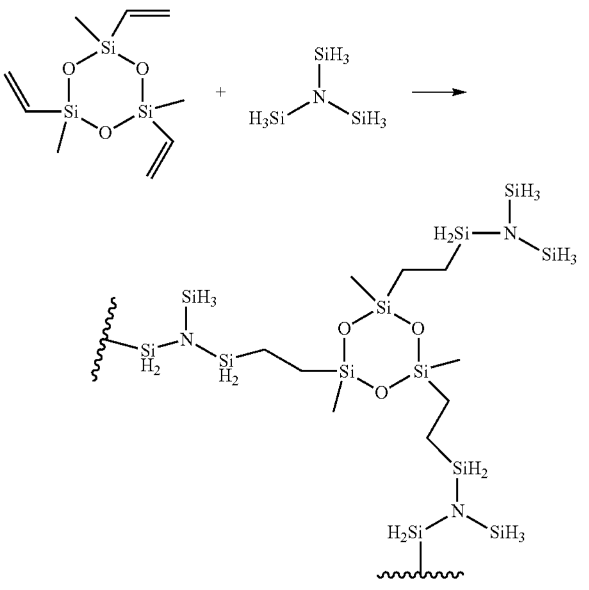

(Low-k 7)

Figure 6:
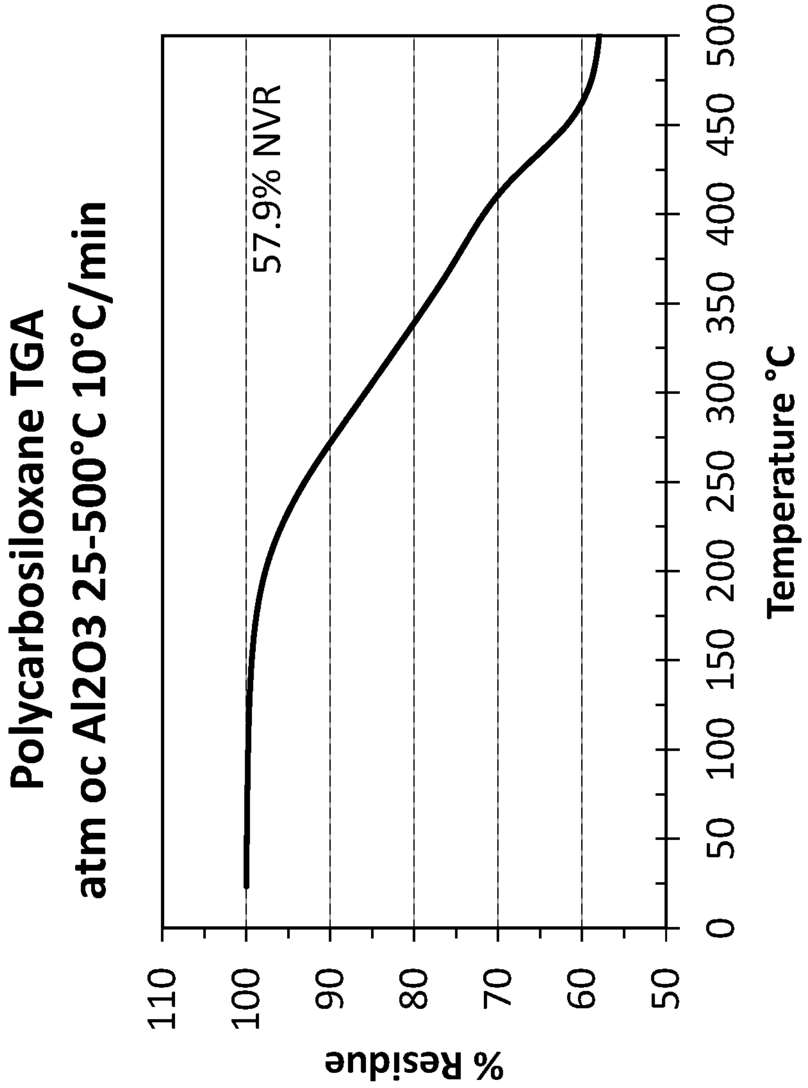
FIG. 6 is TGA of Low-k 4.

A 100 mL glass pressure tube equipped with a magnetic stir bar and Teflon plug was charged with 1,3,5-trivinyl-1,3,5-trimethylcyclotrisiloxane, TSA, catalyst and solvent. The mixture was stirred, heated and then allowed to cool to room temperature. Volatile components were removed en vacuo to furnish a colorless, viscous oil. Thermogravimetric analysis (25-500 °C 10 °C/min) suggested 57.9% of non-volatile residue (NVR) (FIG. 6). Analysis by $^{1}H$ and $^{29}Si$ NMR (not shown) were consistent with the expected structure type as the major component together with a minor component with some vinyl groups remaining unreacted.

SiOC Low-k Film Formed by SOD Using Low-k 7

Figure 7:
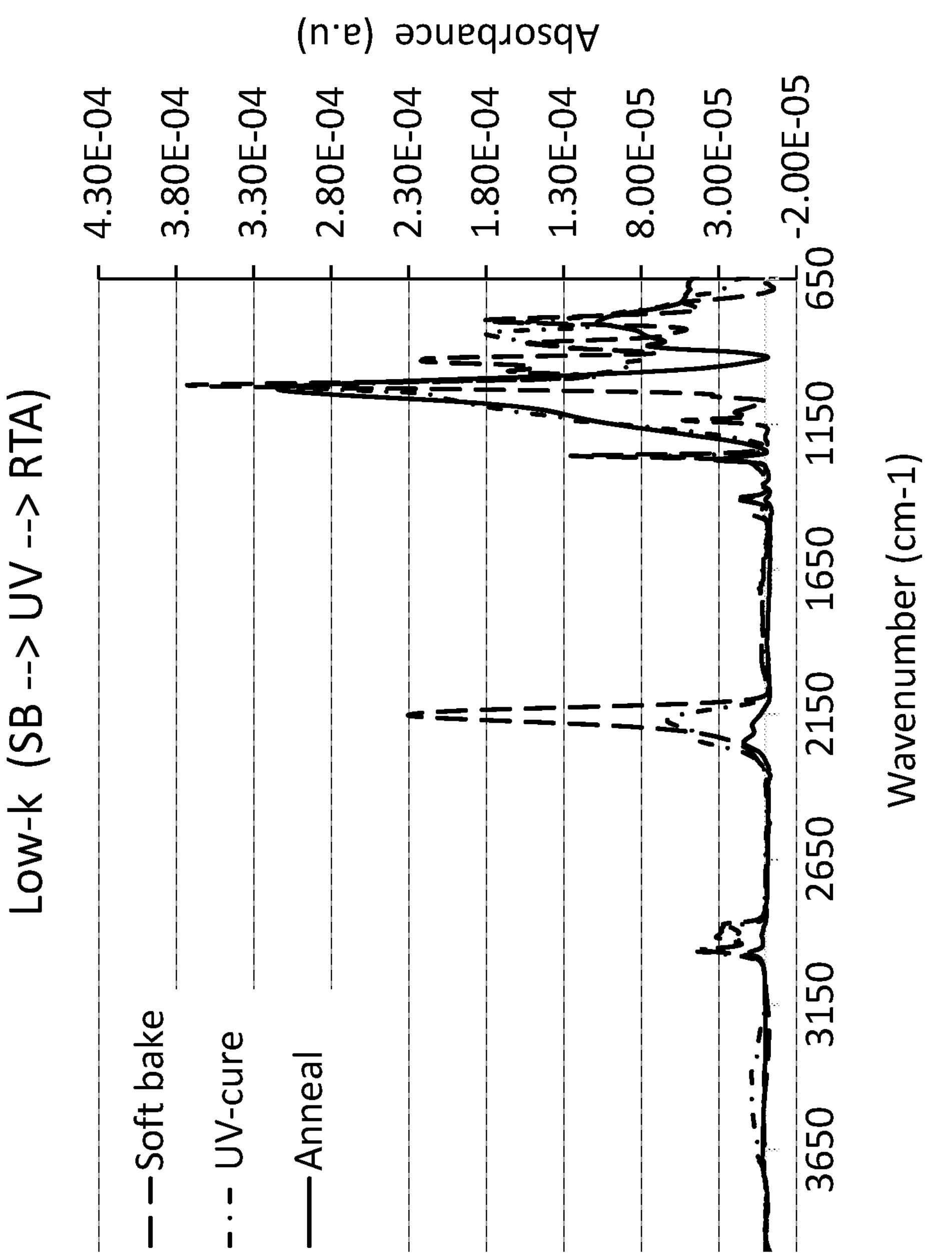
FIG. 7 is a FTIR spectrum (1,500-650 $cm^{-1}$) comparison of pre-baked, UV-cured and annealed of the SOD of SiOC low-k film formed by TSA and (TriVinyl-TriMethyl-Cyclo-TriSiloxane) precursors of Example 4.

A thin film was formed by SOD using a polymer formulation Low k 4 made by TSA and 1,3,5-trivinyl-1,3,5-trimethylcyclotrisiloxane precursors. The SOD film was spun at 2000 rpm, for 60 sec, using a spin coater Laurel WS-650 Mz-8NPPB. The SOD formed film was then soft-baked at 200 °C for 5 min under compressed air atmosphere and UV cured at 1000 mJ/$cm^2$ in compressed air at room temperature (using UV lamp, wavelength 172 nm). Finally, the SOD film was annealed at 600 °Cfor 5 min in $N_2$. FIG. 7 is a FTIR spectrum (1,500-650 $cm^{-1}$) comparison of pre-baked, UV-cured and annealed of the SOD of SiOC low-k film formed by TSA and TriVinyl-TriMethyl-Cyclo-TriSiloxane precursors. As shown, the Si—H bond (at ~2150 $cm^{-1}$) are converted into Si—OH after UV-cure and further converted into Si—O—Si around 1,150-950 $cm^{-1}$ after anneal. Si—$(CH_2)_2$—Si backbone structure is maintained.

A SEM image of the gap filled trench after annealing was measured (not shown). The gap fill is performed on a Si pattern substrate with a $SiO_2$ liner. The pattern structure has an aspect ratio of ~10:1 (height ~1.3 μm and width ~130 nm). Low-k 4 formulation exhibits a complete gap filling, without defects, that is, no delamination, crack or voids are observed. Electrical properties of the SOD film after annealing were collected using a mercury probe, the dielectric constant k is 2.8 (at the frequency of 1 MHZ).

Table 2 is a summary of the performance of each formulation (each data is an as average of at least 3 measurements). Shrinkage has been calculated using the thickness difference between anneal and prebake measured by Ellipsometer.

Electrical properties have be measured using a mercury robe. And the mechanical properties have been measured using a nanoindentor, KLA Tencor iNano.

TABLE 2

| Summary | | | | |
|---|---|---|---|---|
| Polymer | Shrinkage (%) | k-value (@ 1 MHz) | Young's Modulus (GPa) | Hardness (GPa) |
| Low-k 1 | 18% | 3.1 | n/a | n/a |
| Low-k 2 | 20% | 3.0 | 14 | 1.2 |
| Low-k 5 | 10% | 2.7 | 10 | 1.2 |
| Low-k 7 | 10% | 2.8 | n/a | n/a |

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

What is claimed is:

1. A method of forming a silicon and carbon containing film on a substrate, the method comprising the steps of:

producing a film-forming polycarbosilazane polymer by a polymerization of a reaction mixture of a first compound containing at least two unsaturated groups selected from Tetravinylsilane, Dimethyldivinylsilane, Trivinylmethylsilane, 2,4,6-Trimethyl-2,4,6-trivinylcyclotrisilazane, 1,3,5-trivinyl-1,3,5-trimethylcyclotrisiloxane, and Octavinyloctasilasesquioxane, a second compound containing at least two hydrosilyl functional groups, and a catalyst selected from a metal-free or photoreactive catalyst selected from the group consisting of 2,2'-Azobis(2,4-dimethylvaleronitrile), 1,1'-Azobis(cyclohexanecarbonitrile), di-tert-butyl peroxide, benzoyl peroxide, and methyl ethyl ketone peroxide;

forming a solution containing the film-forming polycarbosilazane polymer; and contacting the solution with the substrate via a spin-on coating, spray coating, dip coating, or slit coating technique to form the silicon and carbon containing film on the substrate.

2. The method of claim 1, further comprising the step of pre-baking the silicon and carbon containing film under $N_2$ atmosphere at a temperature ranging from approximately 50 °C to 400 °C; and subsequently hard baking the silicon and carbon containing film by a heat-induced radical reaction or a UV-Vis photo-induced radical reaction in an atmosphere of $O_2$, $O_3$, $H_2O$, $H_2O_2$, $N_2O$, NO, air, compressed air, or combinations thereof at a temperature range of 200-1000 °C to convert the silicon and carbon containing film to a SiOC or SiOCN containing film.

3. The method of claim 1, wherein the film-forming polycarbosilazane polymer is produced by hydrosilylation of the first compound by the second compound.

4. The method of claim 1, wherein the at least two unsaturated groups are vinyl or alkynyl group.

5. The method of claim 1, wherein the at least two hydrosilyl functional groups are at least two —$SiH_2$— groups.

6. The method of claim 5, wherein the at least two —$SiH_2$— groups are three —$SiH_2$— groups.

7. The method of claim 5, wherein the at least two —$SiH_2$— groups are at least two —$SiH_3$ groups.

8. The method of claim 7, wherein the at least two —$SiH_3$ groups are three —$SiH_3$ groups.

9. The method of claim 1, wherein the second compound is selected from $Si_nH_m$, where n>1 and m=2n+2 or 2n (cyclic), $N(SiH_3)_3$, $(SiH_3)_2N$—$SiH_2$—$N(SiH_3)_2$, $(SiH_3)HN$—$SiH_2$—$N(SiH_3)_2$, $(SiH_2N$—$SiH_3)_3$, $HN(SiH_3)_2$, $H_2N(SiH_3)$, $N(SiH_2Me)_3$, $H_2N(SiH_2Me)$, $HN(SiH_3)(SiH_2Me)$, $MeN(SiH_3)_2$, $Me_2N(SiH_3)$, $H_2N[Si(OMe)H_2]$, $H_2N[Si(OMe)_2H]$, or $H_2N[Si(OMe)H_2]$.

10. The method of claim 1, wherein the second compound is trisilylamine, $N(SiH_3)_3$ (CAS No.: 13862-16-3).

11. The method of claim 1, further comprising the step of forming the solution containing the film-forming polycarbosilazane polymer comprising the step of adding a solvent or a solvent mixture to the reaction mixture, wherein the solvent or the solvent mixture is selected from at least one of hydrocarbons, aromatic solvents selected from toluene, xylene, mesitylene, ethers selected from a tert-butyl ethers, THF, glymes, or amines selected from trialkylamine or dialkylamine.

12. The method of 1, wherein the step of producing the film-forming polycarbosilazane polymer comprises a step of adding a polysilane that contains more than two —$SiH_2R$ function groups to the reaction mixture for enhancing the polymerization of the carbosilanes with amines, wherein R is H, a $C_1$ to $C_6$ linear, branched, or cyclic alkyl-group, a $C_1$ to $C_6$ linear, branched, or cyclic alkenyl-group, or a combination thereof.

13. The method of 12, wherein the polysilane is selected from one or more of neopentasilane ($Si(SiH_3)_4$), n-tetrasilane ($SiH_3(SiH_2)_2SiH_3$), 2-silyl-tetrasilane ($(SiH_3)_2(SiH_2)_2SiH_3$), trisilylamine ($N(SiH_3)_3$), or trisilyamine derivatives selected from alkylamino-substituted trisilylamines of trisilylamines.

* * * * *